Patented Feb. 25, 1936

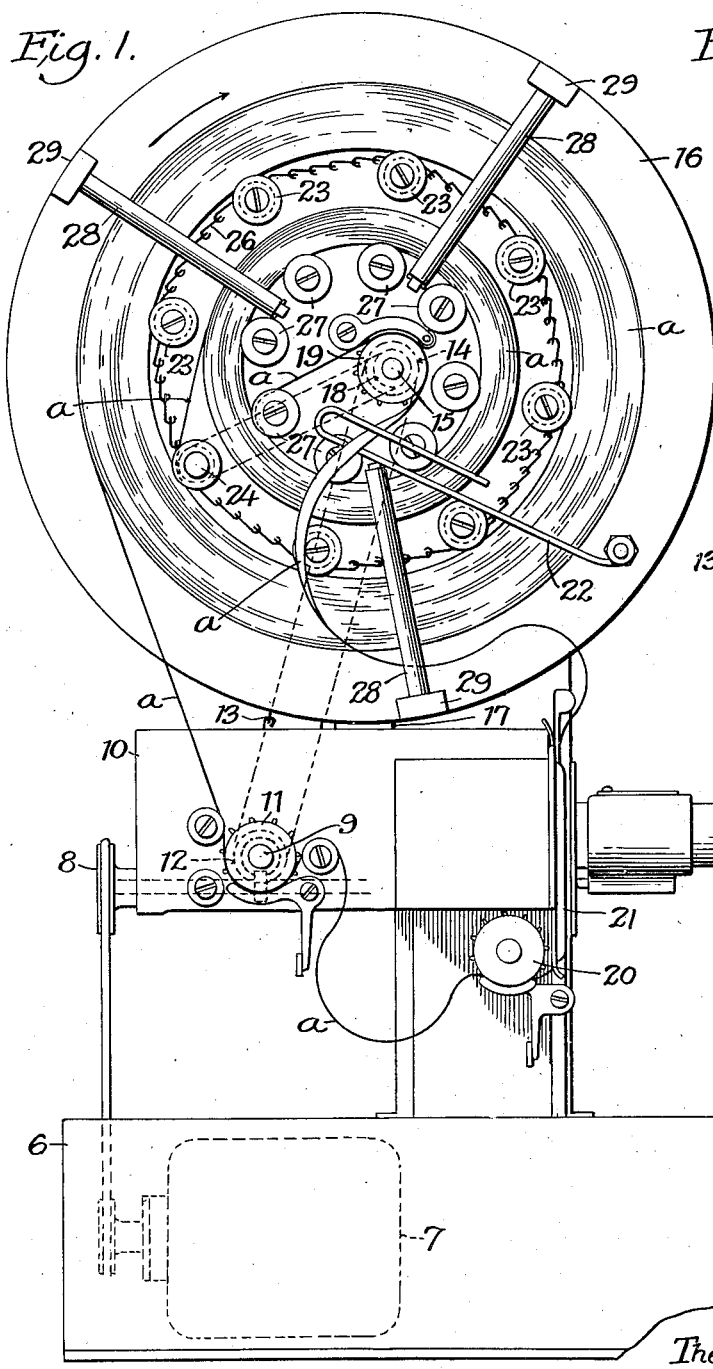
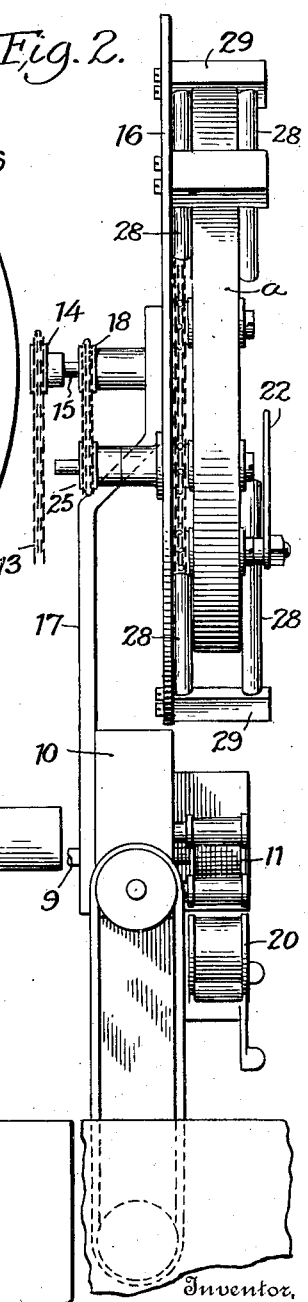

2,032,336

UNITED STATES PATENT OFFICE 2,032,336

MOVING PICTURE FILM REEL

Theodore O. Strauss, New York, N. Y., assignor to Casteel Research Laboratories, Inc., New York, N. Y., a corporation of New York Application May 5, 1934, Serial No. 724,176

4 Claims. (Cl. 88—18.7)

This invention relates to moving picture machines and more particularly to the reel for feeding of the film and the rewinding of the same so that the two operations are synchronized.

The object of the invention is to enclose the endless film in a reel of the usual size and by means of the power that also operates the projector to feed the film before the light and lens in the usual manner, then to carry the film back to said reel and wind it thereon to be again fed for projection. The regulation of the tension of the film is performed automatically by means herein more fully described.

These and other objects of the invention are more fully described in the following specification, set forth in the appended claims and illustrated in the accompanying drawing, wherein:

Figure 1 is a side elevation of a moving picture projector with the improved reel.

Fig. 2 is a rear view of the projector and reel.

In Fig. 1 of the drawing the projector 5 is of usual construction and is mounted on the base 6 that contains the motor 7 as shown in dotted lines, and that drives a pulley 8 at the rear of the projector.

The pulley 8 drives a shaft 9 by means of worm gearing within the housing 10, the said shaft 9 carrying at one end the feed sprocket 11 and at the opposite end the chain sprocket wheel 12, shown in dotted lines, and a driving chain 13 connects wheel 12 with a similar wheel 14 on a shaft 15.

The shaft 15 is journalled in an upright plate 16 that comprises the reel but is rigidly supported on a post 17 secured to the housing 10. The shaft 15 carries besides the driving wheel 14, a feeding sprocket wheel 18 and a film feeding sprocket 19, while a third film sprocket 20 rotating intermittently draws the film through the gate 21 of the machine.

The film is carried in two sections on the reel, being fed to the projector by the sprocket 19 and withdrawn for the rewinding by sprocket 11. Enough of the film is fed from sprocket roller 19 to form a loop before it enters the projector and another loop is formed after the film leaves film sprocket 20. To control the play of the first loop a guide 22 is secured to the upright plate and through which the film passes; the film being designated by A.

The outer coiled section of the film is carried by a series of sprocketed rollers 23 that are loosely journalled on shafts projecting from the plate 16 and one of these rollers is carried by a shaft 24 journalled in plate 16 and having on its outer end a driving sprocket 25 that is driven by sprocket 18, as best shown in Fig. 2. These rollers 23 are all connected and driven by the chain 26 through the sprocket on shaft 24 and the larger film section will be driven in the direction of the adjacent arrow gathering the film from the sprocket feed 11 and exerting a tendency to tighten the coil as it is revolved.

The second or inner coil receives its film direct from the roller on shaft 24 and is wound on the series of rollers 27 that are journalled on appropriate shafts but are not driven by any mechanical power. The inner coil, however, is rotated on these rollers by the strain from the sprocket roller 19 as it draws on the film for feeding and the feeding from the interior of the coil has a tendency to loosen the film of this section.

It will thus be observed that while the tendency of the outer section is to tighten up, that of the inner section is to be loosened so that it may be readily fed and released. The film is endless and may be used repeatedly on the projector so that the same scenario may be run without the trouble and delay of substituting new and separate films.

To retain the films in position radial rollers 28 are mounted beside the coils on brackets 29, the inner rollers being shorter so as not to interfere with the chain 26.

It is obvious that the parts of the device may be otherwise arranged or modified without departing from the essential features above described or from the scope of the appended claims.

What I claim as new is:

1. In motion picture reels, the combination of an upright plate, a series of rollers journalled and rotatably mounted around a central point of the said plate, sprocket wheels on the rollers, means for rotating one of the rollers, a chain engaging all of the sprocket wheels, a second set of idler rollers rotatably mounted on the upright plate concentric and within the first series, an endless film separated into two coil sections each section being carried on one of the roller series, and anti-friction rollers rotatably mounted on the upright plate for the sides of the film sections.

2. In motion picture film reels, the combination of a projector, an upright supporting plate carried by said projector, a series of rollers journalled in a circle about a common centre on said plate, an endless film carried as a coil on said series of rollers, means for rotating said rollers to wind the coil, means feeding the film from said coil through the projector, a second series of rotating rollers on the supporting plate journalled concentrically with the first series of rollers having an annular space between the two sets of rollers and adapted to wind a second coil of the film from the projector and to feed said second coil to the first coil, and means for feeding the film from the projector to the said second coil.

3. In motion picture film reels, the combination of a projector, a film, an upright supporting plate mounted on said projector, a series of rollers journalled in a circle about a common centre on said plate and adapted to wind a part of the film as a coil and pay out same to the projector, a second series of rollers concentric with the first series and having an annular space between the two series, the said second series of rollers adapted to gather a coil of the film from the projector and to feed it to the coil on the first mentioned series of rollers, means for driving the first series of rollers, means for driving the second series of rollers, and loops formed in the film before entering the projector and after being drawn from the projector.

4. In motion picture film reels, the combination of a projector, an endless film adapted to be looped into two coils, the first coil feeding to the other or second coil and from the latter through the projector after which the film joins the first coil, an upright plate secured to the projector, a series of rotating rollers journalled on the said plate and winding the first mentioned coil of the film, means for rotating the rollers of said series of rollers, a second series of rollers concentric with the first series and within the same and their coil and adapted to provide space to receive and unwind said second coil, means for releasing the film from the inner side of said second coil and feeding it to the projector, a guide looping the said film and directing it to the projector, and sprockets moving the said film to the first mentioned coil and forming a loop in the film.

THEODORE O. STRAUSS.